United States Patent
Fernandez et al.

[11] Patent Number: 5,913,671
[45] Date of Patent: Jun. 22, 1999

[54] FISHING IMPLEMENTS WITH ILLUMINATED HANDLE

[76] Inventors: Richard A. Fernandez, 3733 Lamont; Santos Fernandez II, 3741 Lamont, both of Corpus Christi, Tex. 78415

[21] Appl. No.: 08/767,509

[22] Filed: Dec. 16, 1996

[51] Int. Cl.⁶ .................................................. A01K 75/02
[52] U.S. Cl. ............................................................. 43/18.1
[58] Field of Search ..................... 43/17.5, 18.1, 43/25

[56] References Cited

U.S. PATENT DOCUMENTS

| | | | |
|---|---|---|---|
| 4,085,437 | 4/1978 | Hrdicka et al. | 43/17.5 X |
| 4,750,287 | 6/1988 | Myers | 43/17.5 |
| 4,775,920 | 10/1988 | Seibert et al. | 43/17.5 X |
| 4,780,980 | 11/1988 | McCullough | 43/17.5 |
| 4,869,011 | 9/1989 | Whiting et al. | |
| 5,172,508 | 12/1992 | Schmidt et al. | 43/17.5 X |
| 5,182,873 | 2/1993 | Aragon, Jr. | |
| 5,276,990 | 1/1994 | Ramirez | |
| 5,347,741 | 9/1994 | Konrad | |
| 5,357,410 | 10/1994 | Cota et al. | 43/17.5 X |
| 5,406,735 | 4/1995 | Howell | 43/17.5 |
| 5,504,342 | 4/1996 | Jaynes et al. | 43/17.5 X |
| 5,555,667 | 9/1996 | Bae et al. | 43/17 |
| 5,586,403 | 12/1996 | Ward | 43/17.5 |

FOREIGN PATENT DOCUMENTS 404053437  2/1992  Japan ........................ 43/17.5

*Primary Examiner*—Joseph J. Hail, III
*Assistant Examiner*—Anthony Ojini
*Attorney, Agent, or Firm*—G. Turner Moller

[57] ABSTRACT

An illuminated handle is provided for a fishing rod, a gig, a gaff, a net and an oar. The illuminated handle includes a light transmitting hollow tubular handle having a florescent lamp inside to illuminate the area around a user. The handle includes a screw threaded end providing access to a carrier slidably received in the handle. The carrier provides a battery, a ballast for starting the florescent lamp and a pair of exposed contacts. A switch extends through the handle engages the contacts and either closes or opens the contacts to turn the lamp off and on. In one embodiment, the carrier resides along a mid-plane of the handle providing a storage compartment between the carrier and the top side of the handle. In one embodiment, a rod tip illuminator is attached to the tip end of the fishing rod and includes a light emitting diode, one or more batteries and a switch.

11 Claims, 4 Drawing Sheets

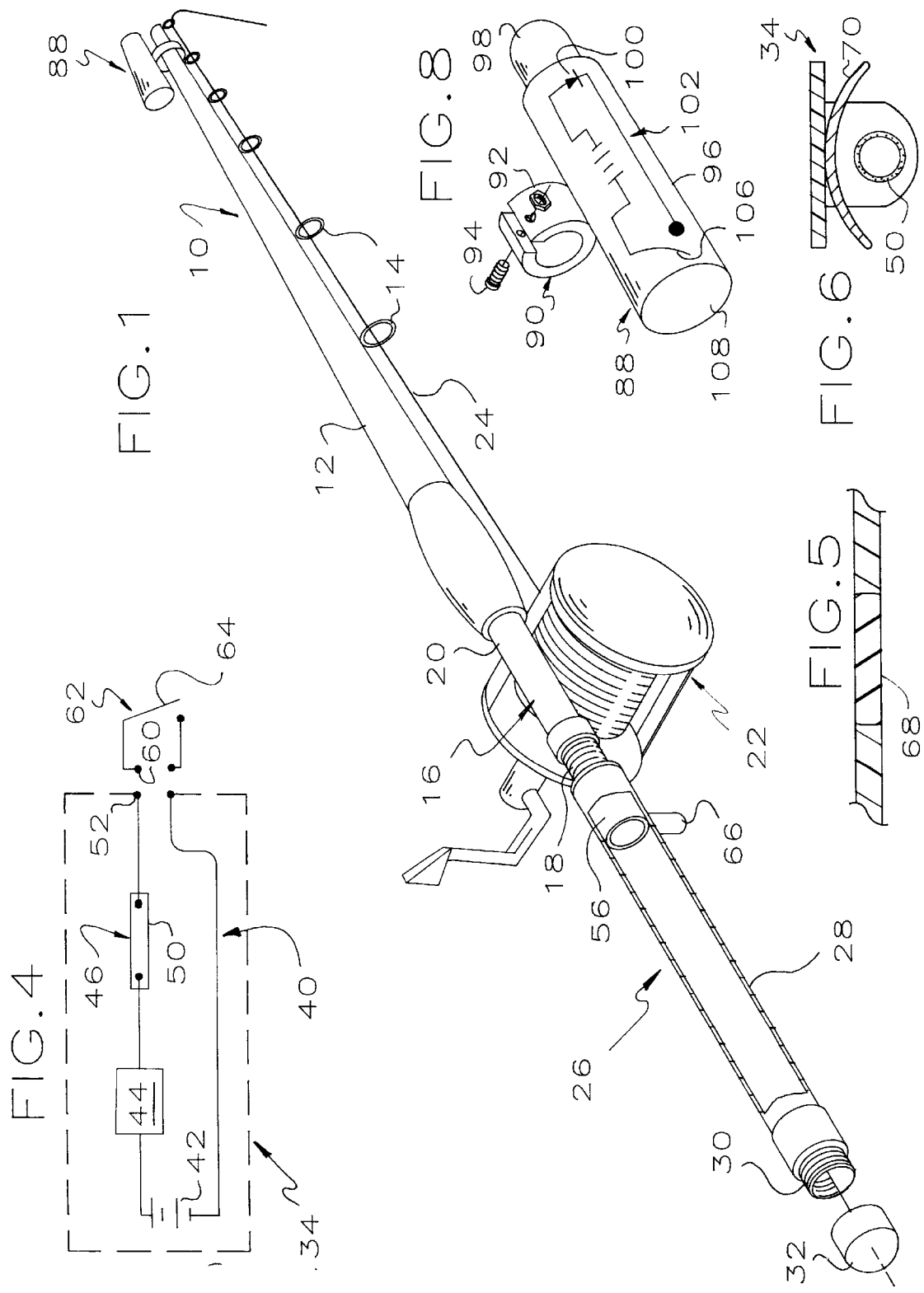

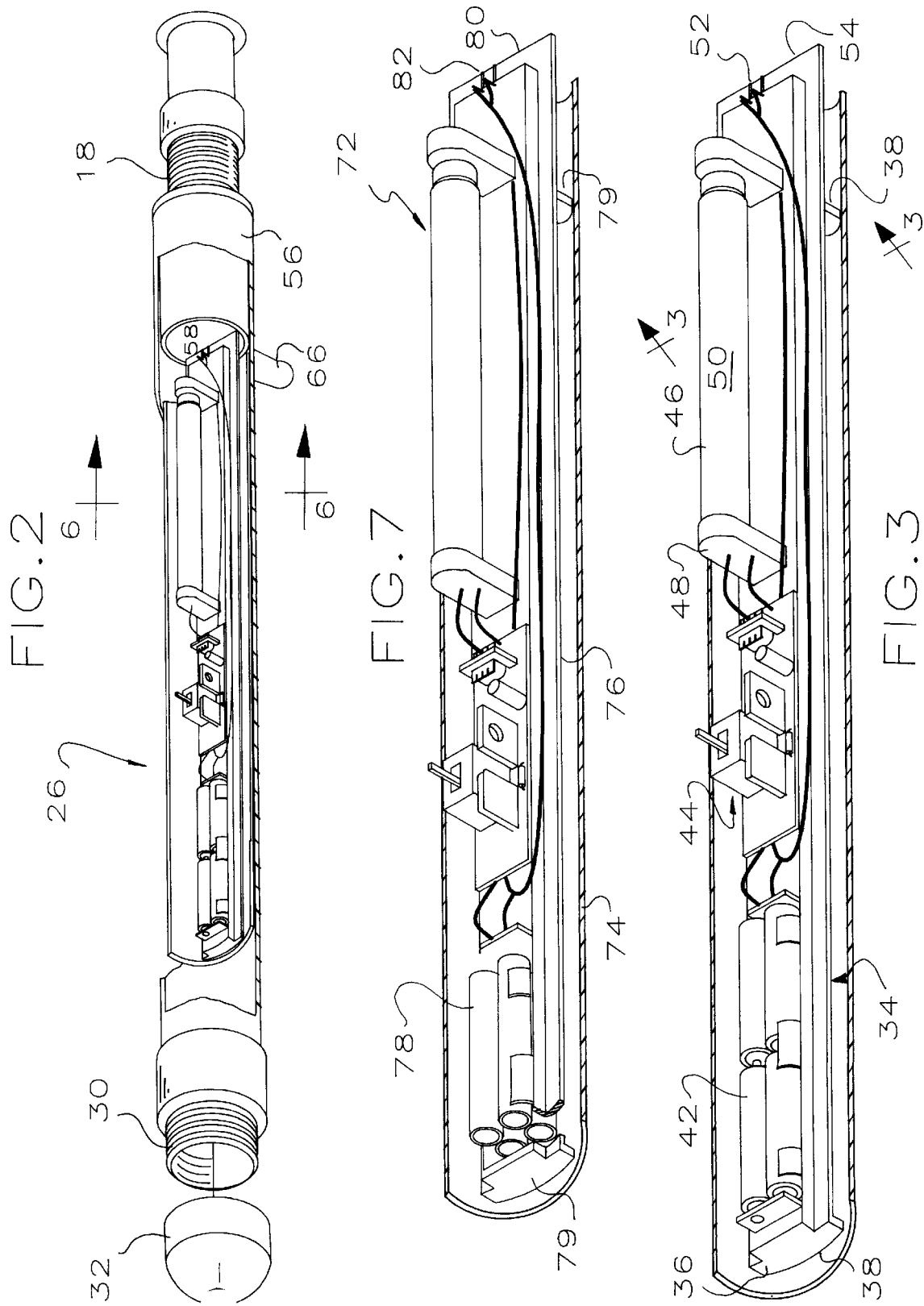

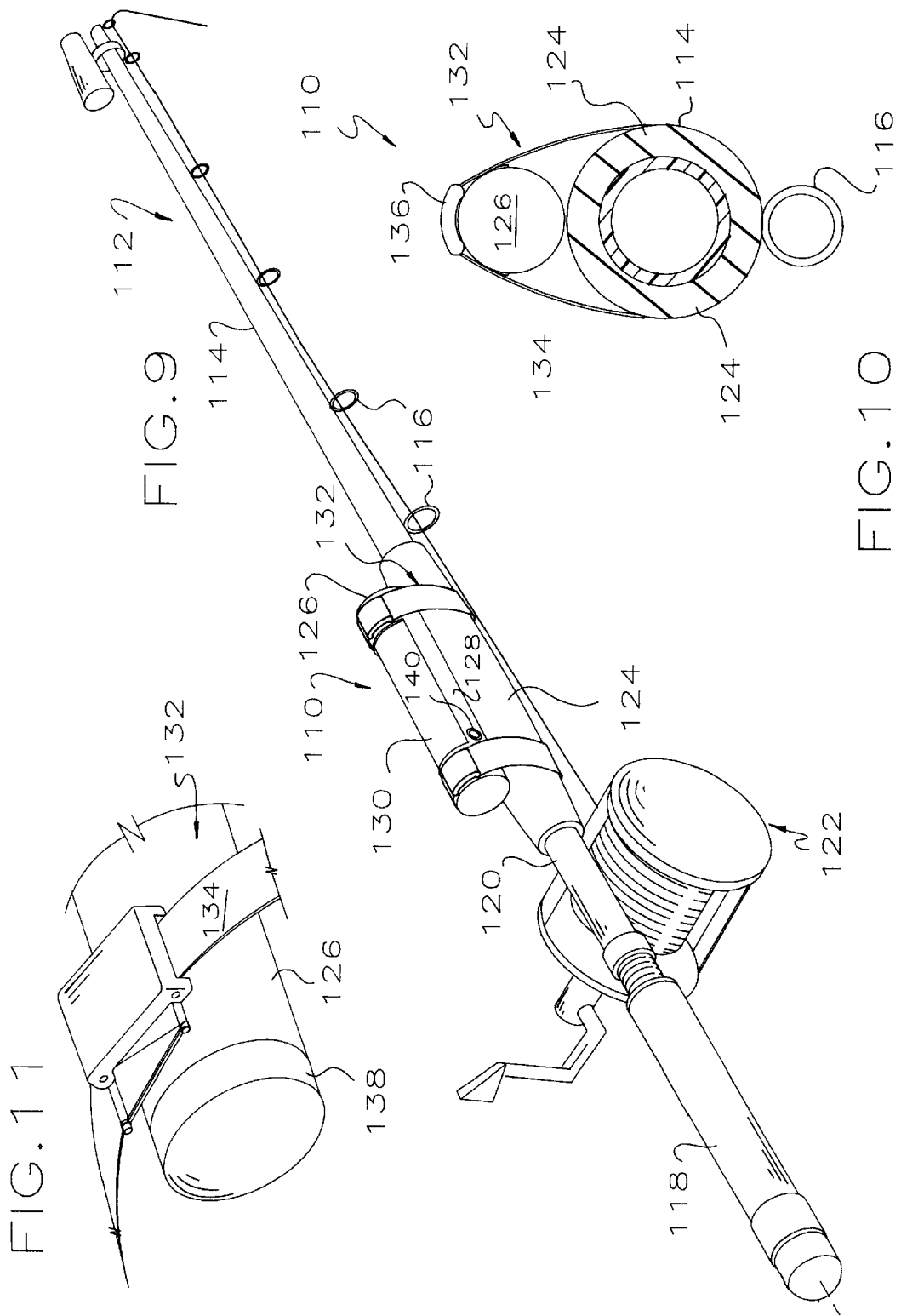

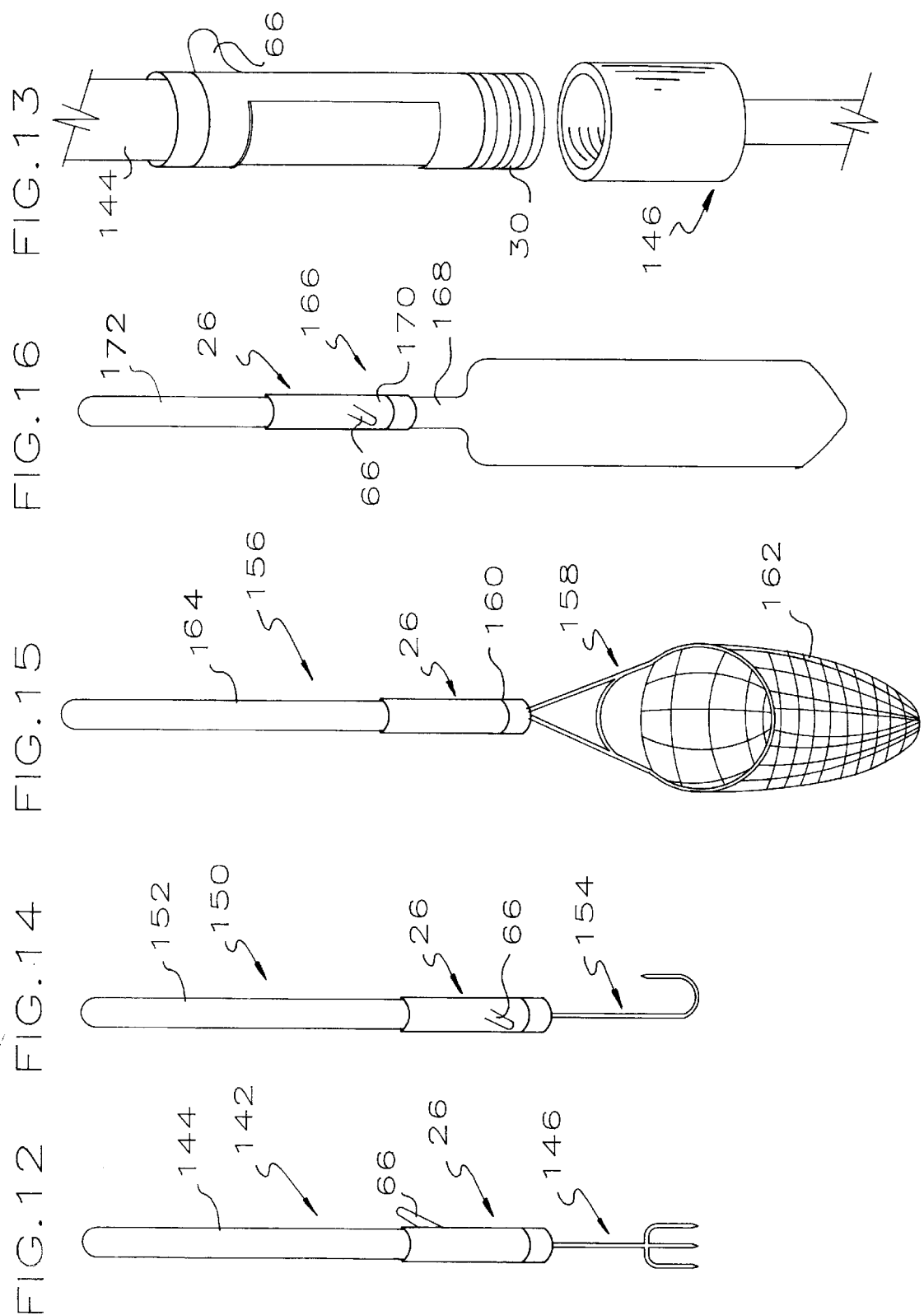

FISHING IMPLEMENTS WITH ILLUMINATED HANDLE

This invention relates to a fishing implement having an having an illuminated handle.

BACKGROUND OF THE INVENTION

Fishing rods have been proposed that incorporate a variety of illuminating devices in order to make a fishing rod more visible to the fisherman or to illuminate the area immediately around the fisherman. Typical examples are shown in U.S. Pat. Nos. 5,172,508; 5,182,873; 5,276,990 and 5,347,741.

SUMMARY OF THE INVENTION

According to one embodiment of this invention, a more-or-less conventional rod is attached to a hollow, light transmitting handle. Access to the handle is provided by a threaded end cap. A carrier slides into and out of the handle. A florescent bulb, an illumination circuit including a ballast and the like, and suitable batteries are provided on the carrier. The carrier also includes a pair of switchable contacts which, when closed, complete the illumination circuit and energize the bulb. A switch is provided on the exterior of the handle and extends into the interior of the handle to engage the switchable contacts and complete the circuit. The carrier is accordingly slidable into and out o the handle in a path intersecting the switch.

The handle is light transmitting, i.e. it is transparent, or translucent, between the butt end of the handle and a reel holder, on the underside of the handle. Light is accordingly cast downwardly toward the fisherman's feet so the area around the user is illuminated. Because the bulb is florescent as opposed to incandescent, the handle remains cool and electrical energy consumed by the bulb is minimized thereby prolonging the life of the batteries.

In accordance with another embodiment of this invention, a separate light module is attached to a resilient part of the rod, forward of the reel mount. The light module includes a florescent lamp assembly mounted on a carrier which slides out of the light module and casts light downwardly, away from the users face.

A light emitting diode is positioned on or adjacent the rod tip to provide a visual indication of a strike. The light emitting diode is in a self contained module having two watch batteries as a source of energy.

In accordance with other embodiments of this invention, the same handle used in the fishing rod is used as part of a flounder gig, a gaff, a fishing net and an oar or boat paddle.

It is an object of this invention to provide an illuminated handle for various fishing implements.

Another object of this invention is to provide an illuminated handle including a carrier movable into and out of the handle providing the necessary equipment for illuminating the handle.

A further object of this invention is to provide a fishing rod having an illuminated rod tip.

Still another object of this invention is to provide a fishing rod having a handle illuminated by a florescent lamp.

A further object of this invention is to provide a fishing rod having a separable florescent lamp attached to a resilient part of the rod.

These and other objects and advantages of this description will become more apparent as this description proceeds, reference being made to the accompanying drawings and appended claims.

BRIEF DESCRIPTION OF THE DRAWINGS

FIG. 1 is an isometric view of a fishing rod of this invention illustrated bottom side up;

FIG. 2 is an enlarged isometric view of the device of FIG. 1, showing details of the handle and equipment contained therein, also illustrated bottom side up;

FIG. 3 is a further enlarged isometric view of the device of FIGS. 1 and 2, showing details of the illumination equipment in the handle, also illustrated bottom side up;

FIG. 4 is a circuit diagram of the electrical circuit of this invention;

FIG. 5 is an enlarged view of another embodiment of the switching mechanism of this invention;

FIG. 6 is an inverted enlarged cross-sectional view of the florescent bulb of FIG. 3, taken substantially along line 3—3 thereof, as viewed in the direction indicated by the arrows, illustrated top side up;

FIG. 7 is an enlarged isometric view of a slightly different embodiment of the invention;

FIG. 8 is a partly schematic enlarged view of the rod tip illuminator of this invention;

FIG. 9 is a view similar to FIG. 1 of another embodiment of this invention;

FIG. 10 is a cross-sectional view of the illuminated fishing rod of FIG. 9, taken along line 10—10 thereof as viewed in the direction indicated by the arrows;

FIG. 11 is an enlarged view of the buckle used to attach the separate light module of FIGS. 9 and 10 to the rod; and FIG. 12 is a side view of a flounder gig equipped with a handle of this invention;

FIG. 13 is an enlarged isometric view of the connection between the flounder gig and the illuminated handle of this invention;

FIG. 14 is a side view of a gaff equipped with a handle of this invention;

FIG. 15 is a side view of a fishing net equipped with a handle of this invention; and FIG. 16 is a side view of a boat paddle equipped with a handle of this invention.

DETAILED DESCRIPTION

Referring to FIGS. 1–4, a fishing rod 10 comprises a more-or-less conventional tapered rod 12 having a plurality of ferrules or line guides 14 mounted on the top of the rod 12. The back end 16 of the tapered rod 12 terminates in a threaded connection 18. Forward of the threaded connection 18 is a reel mount 20 on which is secured a conventional reel 22 on which is wound a line 24 passing through the ferrules 14.

Attached to the threaded connection 18 is a handle 26 of this invention. The handle 26 includes a tubular section 28 that is light transmitting, i.e. transparent or translucent, preferably only on the bottom or underside, so light emitting from the handle 26 is cast toward the feet of the user. The handle 26 may be made of any suitable polymer, such as polycarbonate. The handle 26 terminates in a threaded connection 30 closed by an end cap 32.

A carrier 34 is slidable into and out of the open end of the handle 26 and includes a base 36 having a pair of semicircular supports 38 fitting the curvature of the tubular section 28 and spacing the base 36 near a central plane of the handle 26 as shown best in FIG. 3. As shown in FIGS. 3 and 4, the carrier 34 provides an illumination circuit 40 including a plurality of batteries 42, a florescent lighting circuit 44 including a ballast, a florescent lamp 46 including a pair of bulb supports 48 and a florescent bulb 50. The components of the lighting circuit 44, as heretofore described, are of conventional type, e.g. such as are found in a florescent lamp known as GE Portable Lantern, available from General Electric Company, Lighting Division, of St. Louis, Mo. Also comprising part of the lighting circuit 44 are a pair of spaced stationary contacts 52 which wrap around the end 54 of the carrier base 36 as shown in FIG. 3. As will be more fully apparent hereinafter, the illumination circuit 40 is on one side of the base 36 and the space between the supports 38 is used for storage. Access to the storage compartment is provided by removing the end cap 32 and sliding the carrier 36 out of the handle 26.

As shown in FIG. 2, a plug 56 is provided near the forward end of the handle 26, conveniently threads onto the connection 18 and is rigid with the light transmitting handle 26. The rear end of the plug 56 provides a slot 58 sized to receive the end 54 of the carrier base 36 and thereby orient the carrier 34 so the switchable contacts 52 are positioned to engage the contacts 60 of a switch assembly 62 having a movable switch arm 64 that is latched in either the open position or in the closed position. Thus, the contacts 52 wrap around or extend through the carrier 34 so they are exposed on the top side of the carrier 34 in a position to engage the contacts 60 of the switch 62. The switch assembly 62 is sealed relative to the handle 26 to provide a water tight arrangement. The switch assembly 62 may of any suitable type and may have an operator under a flexible rubber like diaphragm 66 extending above the surface of the handle 26 as shown in FIGS. 1 and 2, or flush with the surface of the handle as shown by the diaphragm 68 in FIG. 5.

It is much preferred that the light cast by the florescent bulb 50 be directed downwardly toward the feet of the user rather than upwardly into the eyes. This may be accomplished in a variety of ways, as by coating the upper inside or upper outside of the tubular section 28 with an opaque material or by providing a reflector 70 on the top side of the bulb 50 as shown in FIG. 6.

Referring to FIG. 7, there is illustrated another illuminated handle 72 of this invention comprising a tubular section 74 that is light transmitting, at least on the underside of the handle 72 so light is cast downwardly toward the feet of the user. A carrier 76 provides four batteries 78 mounted two above the carrier 76 and two below the carrier 76 rather than end-to-end. A support 79 spaces the ends 80 of the carrier 76 along a center plane of the handle 72. A pair of contacts 82 are mounted for engagement with a suitable switch for opening and closing the illumination circuit. A support 84 adjacent the batteries 78 spaces the carrier 76 along the center plane of the handle 72. Because the battery arrangement is more compact, several features are available. The handle may be shorter or a storage compartment may be provided adjacent the end cap or between the supports 79, 84. Access to the storage space at the end of the handle is obtained by removing the end cap (not shown). Access to the storage space between the supports 79, 84 is provided by removing the end cap (not shown) and sliding the carrier 76 out of the handle 72.

Referring to FIGS. 1 and 8, there is illustrated a rod tip illuminator 88 comprising another feature of this invention. The illuminator 88 includes a clamp 90 for attachment to the rod tip and may be of any suitable type, such as a slightly flexible, plastic C-shaped structure 92 which is closed by an Allen screw 94. The illuminator 88 also includes a generally tubular housing 96, which in a prototype of the device, is about the size of a lipstick tube. One end of the housing 96 includes a transparent bullet shaped lens 98 having a light emitting diode 100 embedded in the base. The light emitting diode 100 is part of a circuit 102 including a watch type battery 104 and a switch 106 accessible through a movable or flexible end wall 108.

Referring to FIG. 9, there is illustrated another embodiment of this invention comprising a separate light module 110 removably connected to a fishing rod 112. The fishing rod 112 is of a conventional type including a tapered rod 114 having a plurality of ferrules 116 thereon, a conventional non-illuminated handle 118, a reel mount 120 carrying a reel 122 and a resilient rubber hand grip 124.

The light module 110 includes a waterproof housing 126 comprising an opaque section 128 abutting the hand grip 124 and a light transmitting cover 130 positioned to cast light downwardly toward the feet of the user. The light module 110 is connected to the fishing rod 112 by a pair of spaced assemblies 132 including a flexible web or strap 134 and any suitable strap fastener such as a toggle type buckle 136. The toggle type buckle 136 is sufficient to tighten the strap 134 to compress the rubber hand grip 134 and thereby firmly attach the module 110 to the rod 112.

The light module 110 preferably includes a removable end cap 138 that is sealed to the housing 126 in a water tight construction. A carrier (not shown), similar to the carriers 34, 76, carries an elongate florescent bulb, illumination circuit and batteries and slides out of the housing 126 so the batteries may be replaced. The light module 110 is preferably similar to a light made by Eveready Battery Company, Inc., St. Louis, Mo. and known as a Sport Gear-Florescent Area Lamp except that the housing 126 is cylindrical and a switch button 140 is accessible on a side of the housing 126 away from the resilient hand grip 124.

Referring to FIGS. 12 and 13, a flounder gig 142 includes an illuminated handle which may be identical, on the exterior, to any of the handles 26, 72, and which may have any of the interior configurations disclosed previously. The illuminated handle 26 is unscrewed from the threaded connection 18 of the rod 12 and connected to an unilluminated handle or extension 144. The end cap 32 is unthreaded from the connection 30 and a gig implement 146 is threaded onto the connection 30. Suitable seals (not shown) are provided to make the illuminated handle 26 water tight so it may be lowered below the water line to look for flounder or other bottom fish.

Referring to FIG. 14, a gaff 150 includes an illuminated handle which is preferably identical, on the exterior, to the handle 26 and which may have any of the interior configurations disclosed previously. An unilluminated handle or extension 152 is threaded into one end of the handle 26 and a gaff implement 154 is threaded onto the other end. It will be apparent that the handle 26 may be oriented with either end up or down. Suitable seals (not shown) are provided to make the illuminated handle 26 water tight.

Referring to FIG. 15, a fishing net 156 includes an illuminated handle which is preferably identical, on the exterior, to the handle 26 and which may have any of the interior configurations disclosed previously. A net frame 158 is threaded into the handle end 160 that receives the threaded rod end 18 and provides a conventional mesh net 162. An unilluminated handle or extension 164 threads into the end cap end of the handle 26.

Referring to FIG. 16, a boat paddle or oar 166 includes an illuminated handle which is preferably identical, on the exterior, to the handle 26 and which may have any of the interior configurations disclosed previously. A shank 168 of an otherwise conventional oar is threaded into the handle end 170 that receives the threaded rod end 18. An unilluminated handle or extension 172 threads into the opposite end of the handle 26.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

We claim:

1. An illuminated fishing rod comprising an elongate tapered rod having a longitudinal axis, a front tip, a back end and a reel mount adjacent the back end;

a plurality of line guides spaced between the front tip and the back end of the rod;

a hollow generally tubular shaped handle attached to the back end of the rod including an upper side and a lower side, and an elongate light transmitting section generally parallel to the longitudinal axis on the lower side of the handle;

an elongate florescent lamp bulb inside the handle providing a lamp axis parallel to the longitudinal axis and means directing light from the lamp downwardly through the lower side of the handle toward a user's feet and preventing light from passing through the upper side of the handle; and means for selectively energizing the lamp bulb.

2. The illuminated fishing rod of claim 1 wherein the handle provides an open end normally closed by an end cap and the energizing means comprises a carrier, movable into and out of the open handle end, carrying the elongate lamp bulb;

at least one battery on the carrier;

a pair of contacts in circuit with the lamp bulb and battery; and a switch operable through the handle for engagement with the contacts for selectively opening and closing the contacts and thereby turning the lamp off and on.

3. The illuminated fishing rod of claim 2 wherein the handle includes a first mating connection for receiving and orienting the carrier in a predetermined position and the carrier includes a second mating connection for mating engagement with the first mating connection and the switch includes contacts engageable with the circuit contacts in the predetermined position of the carrier.

4. The illuminated fishing rod of claim 2 wherein the contacts are on the carrier.

5. The illuminated fishing rod of claim 1 wherein the handle is made of a light transmitting tube and the directing means comprises a reflector, inside the handle, reflecting light away from the upper side of the handle toward the lower side of the handle.

6. The illuminated fishing rod of claim 1 wherein the handle is a transparent tube and the back end of the rod is opaque.

7. The illuminated fishing rod of claim 1 wherein the back end of the rod includes a threaded connection and the handle includes a mating threaded connection, the handle and rod being attached by the threaded connections.

8. The illuminated fishing rod of claim 1 wherein the handle provides an open end normally closed by an end cap, a central plane generally bisecting the handle and separating the top side of the handle from the bottom side thereof, and the energizing means comprises a carrier, movable into and out of the open handle end, carrying the elongate lamp bulb and at least one battery, the carrier comprising a base residing generally in the central plane and dividing the handle into a first section on the bottom side of the handle receiving the bulb and a second storage section on the top side of the handle, access to the storage section being by removing the carrier through the open end of the handle.

9. The illuminated fishing rod of claim 1 wherein the handle provides an open end normally closed by an end cap, and the energizing means comprises a carrier, movable into and out of the open handle end, carrying the elongate lamp bulb and at least one battery, the carrier comprising a base slidable out of the open handle end, the handle being substantially longer than the base providing a storage space between the base and the end cap.

10. The illuminated fishing rod of claim 1 further comprising a rod tip illuminator comprising a housing attached to the rod on a side opposite from the line guides and having a light transmitting housing section, a light emitting diode exposed through the light transmitting housing section and an illumination circuit in the housing including a battery and a switch in circuit with the diode whereby light from the diode is cast away from the housing and is visible by a user.

11. The illuminated fishing rod of claim 1 wherein the back end of the rod includes a threaded connection and the handle includes a transparent tube threaded onto the threaded connection, the reel mount being between the threaded connection and the rod tip.

* * * * *